April 6, 1948.　　H. B. LEDFORD　　2,439,012
WHEEL AND AXLE CONSTRUCTION
Filed March 14, 1947
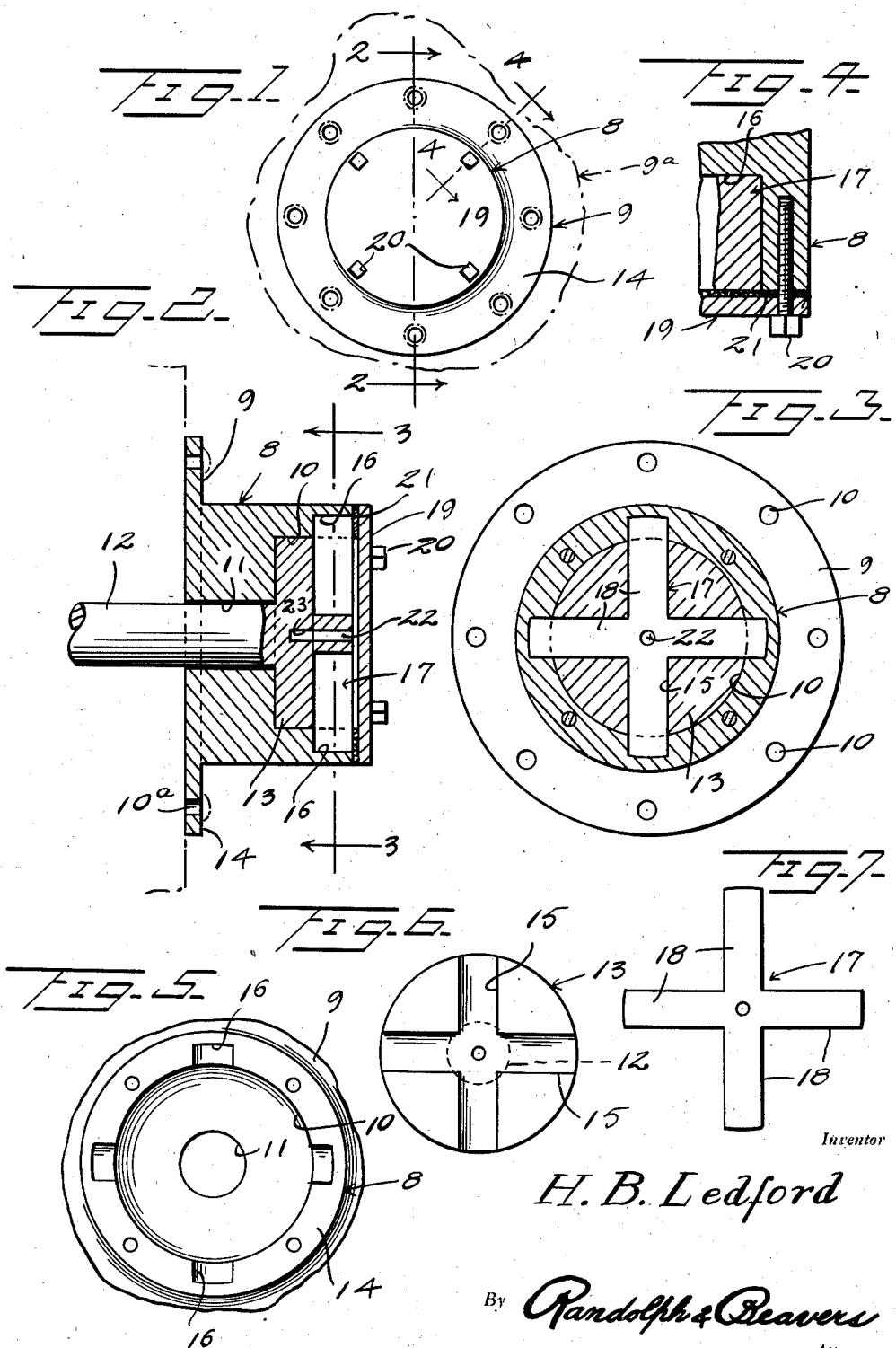
Inventor
H. B. Ledford
By Randolph & Beavers
Attorneys Patented Apr. 6, 1948

2,439,012

UNITED STATES PATENT OFFICE 2,439,012

WHEEL AND AXLE CONSTRUCTION

Hershel B. Ledford, Dahlonega, Ga.

Application March 14, 1947, Serial No. 734,802

3 Claims. (Cl. 301—1)

This invention relates to improvements in wheel and axle construction, especially although not necessarily, for automotive vehicles, the primary object of the invention to provide an arrangement of this character which substantially eliminates lost motion and the possibility of shearing action developing between the wheel and the axle, besides rendering mounting or dismounting of the wheel on the axle easier and quicker.

Another important object of this invention is to provide a structurally stronger and mechanically more efficient construction of the character indicated above, which is of unusual radial and axial compactness, and which, despite increased strength and accessibility, can be made smaller, if desired, than prior constructions of this type.

Other important objects and advantages of this invention will be apparent from the following description and the drawing appended thereto, wherein merely for purposes of illustration, a presently preferred embodiment of this invention is set forth in detail.

In the drawing—

Figure 1 is a fragmentary outboard and elevation of an arrangement in accordance with the present invention.

Figure 2 is a vertical transverse section taken on the line 2—2 of Figure 1.

Figure 3 is a transverse section taken on the line 3—3 of Figure 2.

Figure 4 is a fragmentary section on an enlarged scale, taken on the line 4—4 of Figure 1.

Figure 5 is a fragmentary outboard and elevation showing the wheel hub with the axle flange, cruciform pin, and pin retaining plate removed.

Figure 6 is an outboard end elevation of the axle flange, and,

Figure 7 is a plan view of the cruciform pin.

Referring to the drawing in detail, the numeral 8 generally designates a cylindrical wheel hub having a wheel attaching or wheel mounting flange 9 at its inner or inboard end, provided with bolt holes 10a to accommodate conventional wheel mounting bolts (not shown) for securing in place thereon a wheel 9a.

Opening through the outboard end of the hub 8 is a concentric relatively large diameter cylindrical bore 10, into the inner end of which opens a coaxial smaller bore 11. The smaller bore 11 rotatably receives the driving axle 12 (as shown in Figure 2) and the larger bore rotatably receives the axle flange 13 thereon.

The outboard end or face of the axle flange 13 which is preferably flush with the outboard end or face 14 of the hub 8, is formed with right angularly related diametrical squared slots which intersect to define a cruciform pin seat 15. The outer ends of the slots open through the sides of the axle flange 13 and can be positioned so as to register with similar cross section notches 16 formed in the inner wall of the larger hub bore 10. The outboard sides of the notches 16 open through the outboard face 14 of the hub, so that a cruciform key 17, having right angularly intersecting arms 18 of the proper length and of the same cross section as the slots of the key seat 15 and the notches 16, can be seated in the key seat 15 and notches 16, flush with the outboard face 14 of the hub 8, as shown in Figure 2.

It is obvious that with the key 17 properly fitting the seat 15 and notches 16, the axle 12 and hub 8 are non-rotatably connected together, and that the relatively large cross sections and wide bearing areas of the interengaged parts provide great structural strength and positive resistance to any rotation of the hub 8 and axle 12 relative to each other, whereby danger of looseness or of shearing action between any of the components of the connection, such as accompanies the use of bolts and the like for the purpose, are eliminated.

For holding the axle 12 in the hub 8 against unwanted relative axial movement, the circular retaining plate 19 is provided, of substantially the same diameter as the hub 8. Studs 20 penetrate the retaining plate at intervals and thread into the outboard face 14 of the hub, and the plate 19 is provided with an annular compression gasket 21, wide enough to engage substantially the full width of the hub face 14 and the portions of the arms 18 of the key 17 exposed thereto in the notches 16, whereby upon tightening the studs 20, the plate 19 holds the key 17 engaged with the seat 15 of the axle flange 13, and thereby holds the axle flange 13 in place in the hub bore 10 against the inboard end of the hub bore 10, and at the same time seals the interior of the hub against ingress of dust, dirt, and moisture.

It is obvious that with the device of the invention assembled in operative condition as shown in Figure 2, the hub 8, with or without a wheel 9a mounted on the hub's wheel flange 9, may be rapidly and easily removed by turning out the studs 20 until the retaining plate 19 can be removed.

For convenience in withdrawing the key 17 from and reinstalling the key in the axle flange seat 15, a threaded axial bore 22 may be provided in the key to accommodate a suitable threaded tool (not shown). A similar threaded bore 23 may be provided in the outboard end of the axle flange 13.

With the key 17 removed from the seat 15 it is obvious that the hub 8 may be rotated freely with respect to the axle 12.

Various modifications and changes are contemplated and may obviously be resorted to, without departing from the spirit or scope of the invention as hereinafter defined by the appended claims.

I claim as my invention:

1. A wheel and axle construction comprising an axle having an enlarged diameter axle flange on its outboard end, said axle flange being formed in its outboard face with a key seat opening through the periphery of said flange, a hub formed with a relatively large diameter cylindrical bore opening through its outboard face accommodating said axle flange, said hub further being formed with a reduced diameter bore coaxial with and communicating with the inboard end of the first mentioned bore and accommodating said axle, the side of said large bore being formed with at least one notch opening through the said outboard face of the hub and with which the peripheral opening of said key seat can register, a key loosely fitting said key seat and having a portion to reach into each notch whereby relative rotation of the axle and hub are precluded, and retaining means secured on said hub for holding said key in place.

2. A wheel and axle construction comprising an axle having an enlarged diameter axle flange on its outboard end, said axle flange being formed in its outboard face with a key seat opening through the periphery of said flange, a hub formed with a relatively large diameter cylindrical bore opening through its outboard face accommodating said axle flange, said hub further being formed with a reduced diameter bore coaxial with and communicating with the inboard end of the first mentioned bore and accommodating said axle, the side of said large bore being formed with at least one notch opening through the said outboard face of the hub and with which the peripheral opening of said key seat can register, a key loosely fitting said key seat and having a portion to reach into said notch whereby relative rotation of the axle and hub are precluded, and retaining means secured on said hub for holding said key in place, the outboard end of said axle flange being substantially flush with said outboard face of said hub, and said key being substantially flush with said outboard face of the hub with the inboard end of the axle flange engaging the inboard end of said relatively large diameter bore of the hub.

3. A wheel and axle construction comprising an axle having an enlarged diameter axle flange on its outboard end, said axle flange being formed in its outboard face with a key seat opening through the periphery of said flange, a hub formed with a relatively large diameter cylindrical bore opening through its outboard face accommodating said axle flange, said hub further being formed with a reduced diameter bore coaxial with and communicating with the inboard end of the first mentioned bore and accommodating said axle, the side of said large bore being formed with at least one notch opening through the said outboard face of the hub and with which the peripheral opening of said key seat can register, a key loosely fitting said key seat and having a portion to reach into said notch whereby relative rotation of the axle and hub are precluded, and retaining means secured on said hub for holding said key in place, the outboard end of said axle flange being substantially flush with said outboard face of said hub, and said key being substantially flush with said outboard face of the hub with the inboard end of the axle flange engaging the inboard end of said relatively large diameter bore of the hub, said retaining means comprising a retaining plate removably secured to engage said outboard face of the hub, said key, and the outboard face of said axle flange so as to hold the parts in place.

HERSHEL B. LEDFORD.